Oct. 13, 1942.   G. W. FLETCHER   2,298,530
COMBINED TRAILER AND TENT CONSTRUCTION
Filed July 12, 1941   2 Sheets-Sheet 1
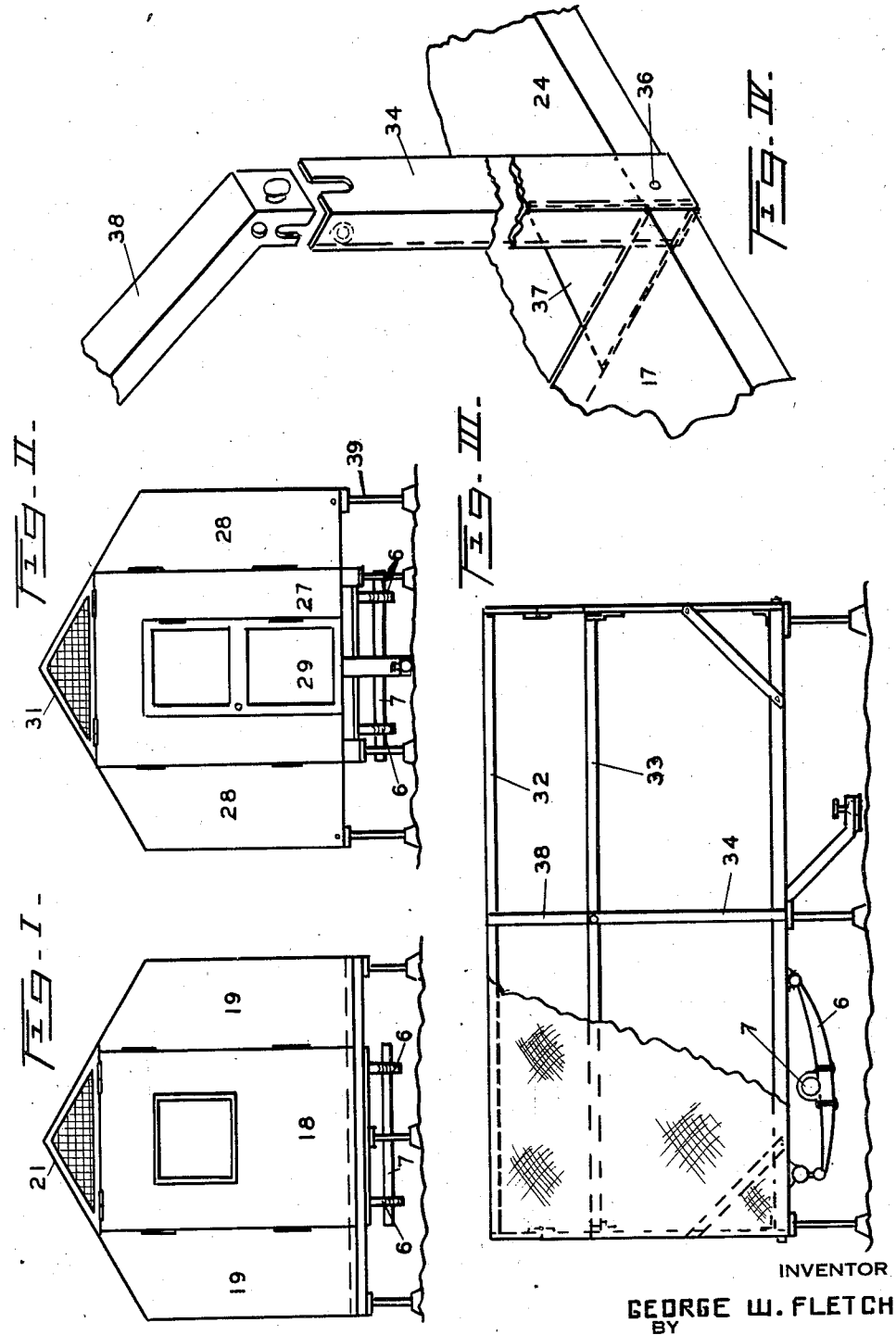
INVENTOR
GEORGE W. FLETCHER
BY Oct. 13, 1942.  G. W. FLETCHER  2,298,530
COMBINED TRAILER AND TENT CONSTRUCTION
Filed July 12, 1941  2 Sheets-Sheet 2
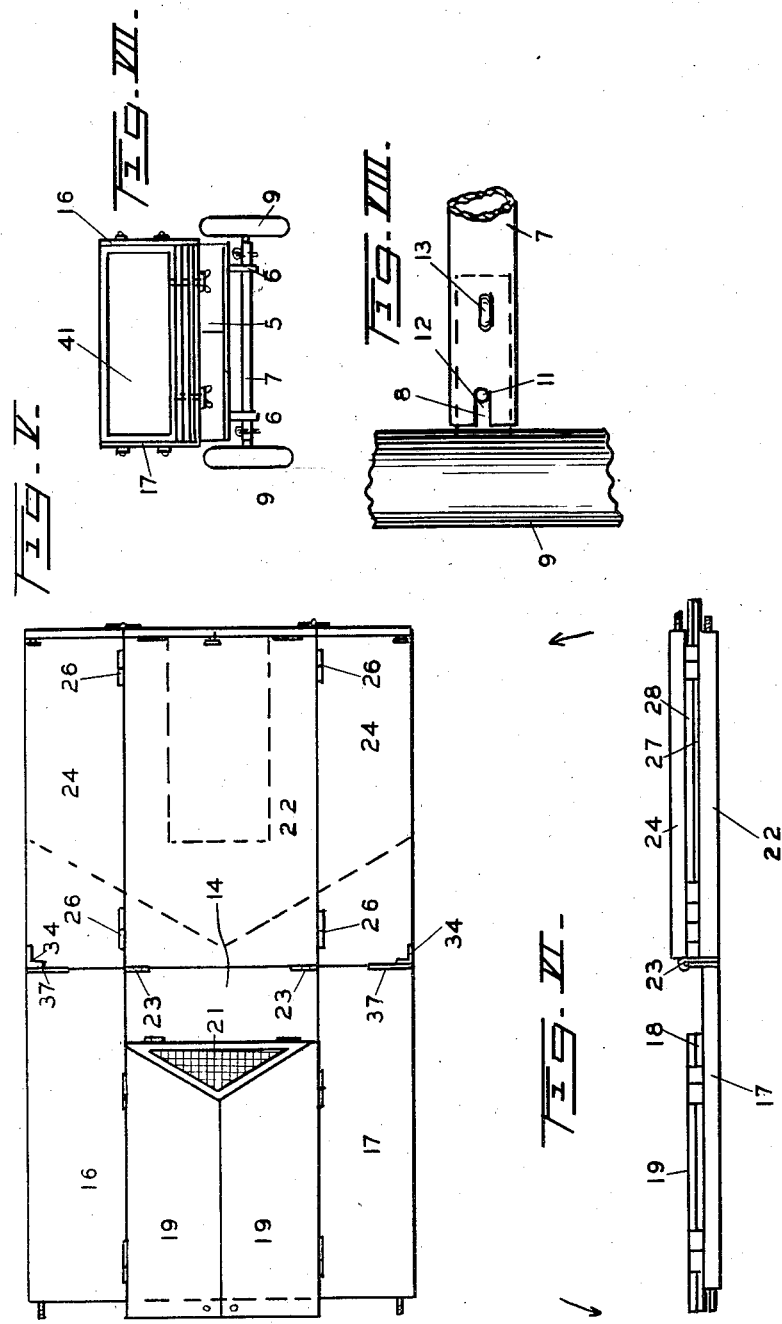
INVENTOR
GEORGE W. FLETCHER
BY Patented Oct. 13, 1942

2,298,530

UNITED STATES PATENT OFFICE 2,298,530

COMBINED TRAILER AND TENT CONSTRUCTION

George W. Fletcher, San Francisco, Calif.

Application July 12, 1941, Serial No. 402,167

2 Claims. (Cl. 20—2)

This invention relates to improvements in a combined trailer and tent construction and is an improvement on my Patent No. 2,236,091.

The principal object of this invention is to produce a combined trailer and tent construction wherein the end portions of the tent fold downwardly upon the floor portions, and the floor portions in turn may be folded together with the end portions to make a compact vehicle body having sufficient capacity to accommodate the canvas roof and side walls together with the bracing and other camping equipment.

A further object of the invention is to produce a device of this character which may be quickly assembled and disassembled, a structure which will be economical to manufacture and is light in weight and, therefore, easily transportable, and a device which will eliminate the customary use of tent pegs, guy ropes, etc.

A further object of the invention is to produce a structure which will resist relatively hard wind storms.

Other objects and advantages will be apparent during the course of the following description.

In the accompanying drawings forming a part of this specification and in which like numerals are employed to designate like parts throughout the same, Fig. I is an end elevational view of my device when unfolded to form a tent structure;

Fig. II is a similar view, showing the opposite end of the tent structure;

Fig. III is a side elevational view of Fig. II, looking from the left and having a portion of the canvas removed;

Fig. IV is a fragmentary perspective view, showing the pivoting and locking of the upright brace between the two floor sections, and the manner in which the roof brace engages the upright;

Fig. V is a top plan view of the floor in extended position with one of the ends elevated and the opposite end folded;

Fig. VI is a side elevation of Fig. V, showing both ends folded and the side extensions of one portion of the right end also folded over and upon the front end section;

Fig. VII is an end view of the device folded to form the trailer body; and

Fig. VIII is a fragmentary detailed view, showing the manner in which the stub axles are secured to the main axle.

Referring to the drawings in detail, and in which like numerals are employed to designate like parts throughout the same, it will be noted that my trailer when folded forms a box-like structure, as shown in Fig. VII. This box-like structure is supported upon a suitable chassis 5 having springs 6 and an axle 7. The axle 7 is hollow so as to receive a stub axle 8, upon which the wheel 9 is mounted. A pin 11 enters the slot 12 so as to align an opening in the stub axle 8 with a similar opening in the axle 7 so that a pin 13 will hold the stub axle and its wheel to the axle. Of course, it is understood that the construction is the same at both ends of the axle.

Mounted on the frame 5 is a main floor section 14, to which are hingedly attached extensions 16 and 17, which when moved to a vertical position form the sides of a body, as shown in Fig. VII. Hinged to one end of the main floor section is a back panel 18 having side wings 19 hinged thereto and a peek section 21 hinged at the upper end of the back panel 18. Hinged to the forward end of the main floor section is a front floor section 22, the hinges connecting these floor sections being shown at 23, where it will be noted that the pintle is offset above the floor level. Auxiliary extensions 24 are hinged to the front floor section and are adapted to be folded over and upon the main floor section, as shown in Fig. VII. The hinges 26 and these auxiliary extensions also have their pintles elevated so that the front panel 27, which is hinged to the main floor section, similar to the panel 18, may be folded thereupon previous to the folding of the auxiliary extensions. The front panel has side wings 28. A door 29 may be formed in the front panel and a peek portion 31 is hinged thereto, corresponding to the peek portion 21.

The construction thus far described, when in extended or unfolded position, forms a relatively large floor area having end sections vertically disposed with relation to the floor. In order to secure a canvas roof and side walls between the end panels, I provide a ridge pole 32 and eave poles 33 which extend between the end panels and have their central portion supported by an upright brace 34. This brace is pivoted, as at 36, to the auxiliary extension 24. It is, of course, understood that the brace upon the opposite side of the vehicle is mounted in the same manner.

A triangular plate 37, secured to the brace 34, extends between the extension 17 and the auxiliary extension 24, thus holding the upright firmly in its upright hinged position. The roof brace 38 extends between the upper end of the upright brace and the ridge pole 32. The eave poles 33 may be attached to the upright brace or to the roof brace, as desired, and in any convenient manner.

From the above description it will be noted that when a person arrives at a camp site with my device, the wheels 9 and their stub axles are removed, and suitable braces 39 are placed beneath the vehicle so as to maintain the same in level position. The end boards 41 are removed in the manner described in my previous patent, and the extensions 16 and 17 are moved from a vertical position to a horizontal position. The overlying parts are now swung upon the hinges 23 until the front floor section 22 is in alignment with the floor section 14. The auxiliary extensions 24 are now swung upon their pivots until they are in a horizontal position in alignment with the extensions 16 and 17. By now elevating the front and rear panels and swinging their respective side wings, the front and back of the tent construction will be completed.

It might here be stated that just before the auxiliary extensions are moved to their last named position, the upright braces are swung upon their pivots 36 so that the roof braces, the ridge pole and the eave poles may be attached thereto, after which a canvas cover may be stretched thereover and the tent construction completed.

In disassembling the tent so that the trailer may again be formed, the process is merely reversed.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A folding tent structure comprising a main floor section, wheels supporting the same, hinges secured to said main floor section, extensions hinged to said main floor section, a front floor section secured to said hinges, the pintle of said hinges being offset above said floor sections, auxiliary extensions hinged to said front floor section, hinged back and front panels secured to said main floor and front floor sections respectively, said back panel, said front panel, said front floor section and said auxiliary extensions all folding over and upon said main floor section, and said first-mentioned extensions when raised to a vertical position engaging the side margins of said superimposed folded portions.

2. A folding tent structure comprising a main floor section, wheels supporting the same, hinges secured to said main floor section, extensions hinged to said main floor section, a front floor section secured to said hinges, the pintle of said hinges being offset above said floor sections, auxiliary extensions hinged to said front floor section, hinged back and front panels secured to said main floor and front floor sections respectively, said back panel, said front panel, said front floor section and said auxiliary extensions all folding over and upon said main floor section, said first-mentioned extensions when raised to a vertical position engaging the side margins of said superimposed folded portions, and a top bracket structure for said floor and end sections.

GEORGE W. FLETCHER.